United States Patent [19]
Douros, Jr. et al.

[11] 3,728,453
[45] Apr. 17, 1973

[54] DIALURIC ACID COMPOUNDS AS ANTIBACTERIAL AND ANTIFUNGAL AGENTS

[75] Inventors: John D. Douros, Jr.; Al Fred Kerst, both of Littleton, Colo.

[73] Assignee: The Gates Rubber Company, Denver, Colo.

[22] Filed: Aug. 6, 1970

[21] Appl. No.: 75,310

[52] U.S. Cl. ................... 424/251, 71/92, 260/45.75
[51] Int. Cl. ........................... A01n 9/00, A01n 9/22
[58] Field of Search ................................ 424/251

[56] References Cited

OTHER PUBLICATIONS

Tipson et al., J. Org. Chem. 16, 1091 (1951).

Bruckmann et al., J. Biol. Chem. 168, 241 (1947).

*Primary Examiner*—Albert T. Meyers
*Assistant Examiner*—Allen J. Robinson
*Attorney*—Raymond Fink, H. W. Oberg, Jr. and Curtis H. Castleman, Jr.

[57] ABSTRACT

Dialuric acid and dialuric acid monohydrate can be used to inhibit and/or prevent the growth of undesirable herbs, bacteria, fungi, yeast, and other microorganisms. This invention is particularly concerned with the bacteriostatic and bactericidal properties of dialuric acid compounds against *Staphylococcus aureus*, *Escherichia coli*, and *Xanthomonas phaseoli*.

23 Claims, No Drawings

DIALURIC ACID COMPOUNDS AS ANTIBACTERIAL AND ANTIFUNGAL AGENTS

BACKGROUND OF THE INVENTION

The present invention relates to the use of compounds of dialuric acid;

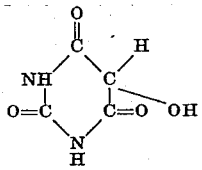

for killing or inhibiting the growth of such microorganisms as bacteria, yeast, and fungi. The chamical literature reveals few subjects, even within the rapidly expanding discipline of biochemistry, which have generated so many patent applications as the areas involving the biochemical use of compounds which contain the bartituric acid nucleus;

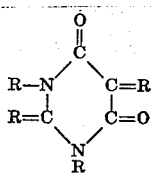

wherein R. represents various substituents. Representatigve uses of such compounds are found in U.S. Pat. Nos.: 2,561,688; 2,605,209; 2,725,380; 2,820,035; 2,887,487; and 3,102,072. However, the biological activity of compounds of dialuric acid have not been previously discovered.

The wide range of biological activity exhibited by dialuric acid compounds means that they can be used in various phases of agriculture. However, the chemical arts must also consider the general principles governing the formulation, method of application, metabolism, and potential toxic hazards of microorganism inhibiting compounds along with their chemical structures and reactions. The dialuric acid and dialuric acid monohydrate compounds of the present invention are no exception. References to some of the biological considerations associated with the use of dialuric acid compounds have been given by such researchers as: Tipson Cretcher, J. Org. Chem. 16, 1091 (1951); Bruekmann and Wertheimer, J. Biol. Chem. 168, 241 (1947); and Bailey, Bailey, and Leech, Bull. New Eng. Med. Center 7, 59 (1945).

SUMMARY OF THE INVENTION

According to the present invention, it has been found that the dialuric acid compounds:

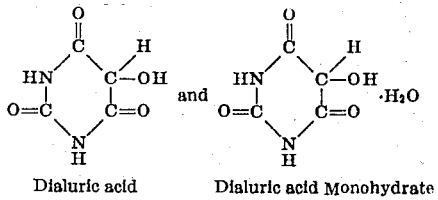

Dialuric acid    Dialuric acid Monohydrate are useful as bactericidal, herbicidal, and fungicidal agents. References concerning the synthesis and structure of dialuric acid are given by: Biltz and Damm, Chem. Ber. 46, 3663 (1913); Tipson and Cretcher, J. Org. Chem. 16, 1091 (1951); and Bolton, Acta Cryst. 19, 1051 (1965).

The dialuric acid compounds of this invention were prepared in the following manner: A 12-liter flask was equipped with an overhead stirrer and immersed in a cold water bath. To this flask was added 2.4 liters of water, 2.4 liters of hydrochloric acid and 1 kilogram of uric acid. While this mixture was rapidly stirred, 400 grams of potassium chlorate were added over a 30-minute period. The solution was then outgassed by bubbling air through it. A stannous chloride solution consisting of 1.7 kilograms of stannous chloride in 1.7 liters of hydrochloric acid was then added to this final reaction mixture and this final solution was refluxed for 45 minutes. The dialuric acid which precipitated was collected by filtration, washed with water and dried. The final product, dialuric acid monohydrate, was characterized by its decomposition point (190°C.), infrared spectrum and nitrogen analysis. The anhydrous material was produced by drying the dialuric acid monohydrate in vacuum at 5 mm. pressure and 150° C. In their antibacterial aspects, the applicants have found the dialuric acid compounds of this invention, when present in effective quantities, act as bactericides against a wide variety of Gram negative and Gram positive bacteria. The in vitro effectiveness of dialuric acid compounds against such bacteria was established by the following tests:

One loopful of each of the investigated bacteria was transferred from agar slants to 10 ml. of trypticase soybroth and incubated at 37° for 18 hours. At the end of this time, the bacteria were seeded into the same medium (+2 percent agar) in which the original inoculum was prepared. The bacteria were then seeded at 1 ml. of inoculum per 250 ml. of medium, which were equivalent to at least $1 \times 10^6$ cells/ml. determined by dilution platecount, nephelometer readings. The resulting mixture was poured into a heat resistant sterile petri dish at a temperature of 45° C. Analytical filter paper discs of ½ inch diameter were used for the agar diffusion technique. Each disc was saturated with 0.08 ml. of the solubilized dialuric acid compounds at 100 ug./disc and placed on the surface of the hardened agar. The plates were incubated at 37° C. for 18 hours. The activity of the dialuric acid compounds was established by measuring the zone of inhibition in centimeters. Untreated control plates were used as a basis for comparison and these exhibited a profuse growth of bateria. The following results were noted:

| Gram positive and Gram negative bacteria | Zone of Inhibition in Centimeters for Dialuric Acid | Zone of Inhibition in Centimeters for Dialuric Acid Monohydrate |
|---|---|---|
| Streptococcus hemolytic Group A Available on Request | 1.5 | 1.2 |
| Streptococcus hemolytic Group B Available on Request | 1.5 | 1.3 |
| Xanthomonas phaseoli ATCC No. 9563 | 1.6 | 1.5 |
| Staphylococcus aureu ATCC No. 209P | 1.7 | 1.6 |
| Escherichia coli ATCC No. 9637 | 2.2 | 2.1 |
| Shigella dysenteriae ATCC No. 9212 | 0.5 | 0.5 |
| Shigella sonnei ATCC No. 9280 | 0.5 | 0.5 |

| | | |
|---|---|---|
| Salmonella panama ATCC No. 7378 | 1.0 | 0.9 |
| Salmonella paratyphi ATCC No. 9281 | 1.0 | 0.9 |
| Salmonella eteritis ATCC No. 13076 | 1.0 | 0.9 |
| Salmonella pullorum ATCC No. 10398 | 1.0 | 0.9 |
| Salmonella derby ATCC No. 6960 | 1.0 | 0.9 |
| Salmonella gallinarium ATCC No. 9184 | 1.0 | 0.9 |
| Salmonella typhimurium ATCC No. Available on Request | 1.0 | 0.9 |
| Samonella typhose ATCC No. 19403 | 1.0 | 0.9 |
| Neisseria gonorrhoeae ATCC No. 19424 | 3.1 | 3.0 |
| Neisseria intracellularis ATCC No. Available on Request | 3.1 | 2.9 |
| Neisseria meningitides ATCC No. 13077 | | |
| Listeria monocytogenes ATCC No. 15813 | 1.5 | 1.3 |
| Vibrio fetus ATCC No. 15296 | 2.0 | 1.8 |
| Vibrio cholera ATCC No. 14035 | 2.0 | 1.8 |
| Mycobacterium leprae ATCC No. 4243 | 1.0 | 0.9 |
| Mycobacterium avium ATCC No. 19421 | 1.0 | 0.9 |
| Mycobacterium bovis ATCC No. 19274 | 1.0 | 0.9 |
| Mycobacterium phlei ATCC No. 11782 | 1.0 | 0.9 |
| Klebsiella pneumoniae ATCC No. Available on Request | 1.9 | 1.5 |
| Micrococcus tetragena ATTC No. 10875 | 1.0 | 0.8 |
| Micrococcus melitensis ATCC No. 19399 | 1.0 | 0.8 |
| Micrococcus lysodeikticus ATCC No. 4698 | 1.0 | 0.8 |
| Corynebacterium diphtheriae ATCC No. 19409 | 2.2 | 2.0 |
| Corynebacterium haemolyticum ATCC No. 9345 | 2.2 | 2.0 |
| Diplococcus intracellularis ATCC No. Available on Request | 2.2 | 2.0 |
| Diplococcus pneumoniae ATCC No. 6303 | 2.2 | 2.1 |
| Hemophilus hemolyticus ATCC No. 10014 | 2.2 | 2.0 |
| Hemophilus influenzae ATCC No. 19418 | 2.2 | 2.0 |
| Hemophilus parainfluenzae ATCC No. 7901 | 2.1 | 1.8 |
| Hemophilus suis ATCC No. 19417 | 2.1 | 1.8 |
| Hemophilus vaginalis ATCC No. 14018 | 2.2 | 2.0 |
| Bacteroides nigrescens ATCC No. Available on Request | 0.9 | 0.8 |
| Bacteroides pneumosintes ATCC No. Available on Request | 1.0 | 0.8 |
| Bacteroides serpens ATCC No. Available on Request | 1.0 | 0.9 |
| Brucella abortus ATCC No. 4315 | 1.0 | 0.9 |
| Brucella melitensis ATCC No. 19396 | 1.0 | 0.8 |
| Brucellasuis ATCC No. 4312 | 1.0 | 0.9 |

Those skilled in the art will recognize that the scope of this invention should not be limited to any particular disease or to any of the particular species of the genera listed above. For instance, the noted activity of dialuric acid and dialuric acid monohydrate against *Xanthomonas phaseoli* suggests that the compounds will also prove to be of value against such other *Xanthomonas* species as *Xanthomonas transluscens*, *Xanthomonas juglandis*, *Xanthomonas vesicatoria*, *Xanthomonas barbareae*, *Xanthomonas pelargonii*, *Xanthomonas alfalfae*, *Xanthomonas vasculorum*, et cetera. Similar possibilities exist for species of the other genera whose activity was shown to be arrested by the dialuric acid compounds.

Although the precise mode of action whereby dialuric acid compounds inhibit the growth of such bacteria is not completely understood, it is generally believed that the dialuric acid compounds of this invention may serve as chemical antagonists; that is, as chemicals which compete with enzymes essential to the development of such bacteria. Since enzymes perform their catalytic function by virtue of their affinity for their natural substrate; any compound resembling a substrate in its chemically critical aspect may also have an affinity for the enzymes. If this affinity is great enough, the analog will displace the normal substrate from the enzyme and will prevent the growth reaction from taking place. It is believed that dialuric acid compounds have a chemical affinity for an essential site on one enzyme necessary for bacterial growth and life.

The above data indicates that dialuric acid compounds may also be used to protect plant life from a wide variety of diseases caused by bacteria. By plant life, it is meant organisms such as living plants, tubers, seeds, bushes, vegetables and trees, and the like. For example, various *Xanthomonas* species are known to cause diseases of tomatoes, sugar cane, rice, sugar beets, cotton, walnuts, wheat, rye, barley, and beans. Some of the more noteworthy species are *Xanthomonas vesicatoria* (Bacteria Leaf Spot of Tomatoes), *Xanthomonas phaseoli* (Common Bacterial Blight of Bean), *Xanthomonas vasculorum* (Gumming Disease of Sugar Cane), and *Xanthomonas malvacearum* (Bacterial Blight of Cotton). Furthermore, this protection is achieved with very little damage to the general environment, since the dialuric acid compounds of this invention exhibit a high degree of biodegradability.

Laboratory tests have also shown that dialuric acid compounds can be used to protect plant life from diseases caused by fungi such as *Fusarium*, *Alternaria*, *Aspergillus*, and *Rhizopus*. This is of commercial significance since many fungi such as those of *Fusarium* cause rotting diseases of corn, sweet potato, and tomato. Dialuric acid compounds have proved to be particularly effective in reducing losses due to Fusarium Wilt of Tomatoes. The effectiveness of dialuric acid compounds against this particular disease was established by the following test procedures and results:

Tomato seedlings, Bonny Best variety, in 7-to 8-leaf growth stage, mounted on compound turntables, were sprayed at 30 pounds pressure with dialuric acid compounds at the concentrations indicated below. After drying, the treated plants were removed to greenhouses and maintained undistrubed for 4 days.

The samples were prepared for spraying by dissolving dialuric acid monohydrate in suitable solvents (acetone, methyl alcohol, ethyl alcohol or other) and diluting to desired concentration with deionized water containing wetting and dispersing agents. Four days after treatment, intact plants with undisturbed root-soil balls were removed from their containers and root dip innoculated by immersion in a Fusarium Wilt of Tomatoe spore suspension and returned to their containers. The inoculated plants were then returned to the greenhouse and observed for disease development.

Disease symptoms generally appeared in the untreated controls approximately 3 weeks after inoculation. Disease severity was determined by a disease index rating in untreated controls based on a zero (no disease symptoms) to 4 (equivalent to 100 percent diseased) scale. All units of these tests included a minimum of three replicates and the effectiveness of any given treatment was expressed as the average (from zero to 4 scale) of disease ratings in the three replicates. The following results were achieved against Fusarium Wilt of Tomatoes:

| Activity: | Foliar fungicide vs. Fusarium Wilt of Tomatoes |
|---|---|
| % Inhibition at 500 ppm: | 62% |
| % Inhibition at 1500 ppm: | 50% |
| Control: | Benlate |
| Control Concentration: | 100 ppm |

Those skilled in the art will recognize that the scope of the instant invention should not be limited to the bacteria and fungi indicated in the above examples. For instance, it should be recognized that other protectant, systemic, and eradicant procedures may provide detection of other biological activities. Pathogens representative of Phycomycetes, Ascomycetes, Basidiomycetes, and the Fungi Imperfecti may provide indices of other fungicidal activity. Other appropriate host plants may establish additional plant tolerance data. Additional pathogens and appropriate host plants may well afford opportunities to further define the degree and spectrum of the activity disclosed in this invention. Since no firm rules of procedure can be laid down for the sequence of such evaluations or for the choice of pathogens, each compound must be considered on the basis of its demonstrated performance in such primary evaluations and then progressively judged in subsequent studies. A wide range of pathogens, representative of economically important diseases, can be used to help define the spectra of activity and to assure high degrees of success under field conditions. The following disease organisms, crops, and reference standards may also be used in such evaluations:

| Disease | Disease Organism | Reference Compound |
|---|---|---|
| Powdery Mildew of Cucumbers | Erysiphe cichoracearum | Maneb, Karathane |
| Leaf Rust of Wheat | Puccinia rubigo-vera | Maneb, Karathane |
| Leaf Rust of Wheat | Puccinia rubigo-vera | Plantvax |
| Bacterial Leaf Spot of tomatoes | Xanthomonas vesicatoria | Streptomycin |
| Rice Blast Disease | Piricularia oryzae | Blasticidin |
| Downy Mildew of Sugar Beet | Peronospora schactii | Karathane |
| Downy Mildew of Lima Bean | Phytophthora phaseoli | Karathane |
| Bean Rust | Uromyces phaseoli var. typica | Maneb |
| Powdery Mildew of Wheat | Erysiphe graminis | Karathane |
| Powdery Mildew of Apple | Podosphaera leucotricha | Karathane |
| Powdery Mildew of Roses | Sphaerotheca pannosa var. rosae | Karathane |
| Powdery Mildew of Cantalope | Erysiphe cichoracearum | Karathane |
| Leaf Spot of Wheat | Helminthosporium sativum | Maneb |
| Early Blight of Tomato | Alternaria solani | Maneb |
| Rice Blast Disease | Piricularia oryzae | Blasticidin |
| Cercospora Leaf Spot of Sugar Beets | Cercospora beticola | Maneb |
| Septoria Leaf Spot of Celery | Septoria apii-graveolentis | Maneb |
| Apple Scab | Venturia inaequalis | Cyprex |
| Common Bacterial Blight of Bean | Xanthomonas phaseoli | Streptomycin, Sulfate |

NOTE: Wherever possible, the applicants recommend the use of "in vivo" procedures to test the dialuric acid compositions of this invention to demonstrate their efficacy under more realistic conditions. However, not all pathogens lend themselves to such tecnhiques. In order to provide additional spectrum definitions, the following fruit-rotting, storage decay, and bacterial pathogens may be tested by "in vitro" methods:

| Brown rot of Stone Fruits | Sclerotinia fructicola | Captan |
|---|---|---|
| Grey Mold of Fruit and Vegetables | Botryis cinerea | Maneb |
| Rhizopus Fruit and Vegetable Rot | Rhizopus nigricans | Maneb |
| Vegetable Rot Citrus Green Mold | Penicillium digitatum | Maneb |
| Citrus Blue Mold | Penicillium italicum | Karathane |
| Bacterial disease of many fruit crops | Pseudomonas syringae | Captan |
| Bacterial Soft Rot | Erwinia caratovora | Captan |

Another important advantage of dialuric acid fungicides, particularly in their agricultural applications, is that they can be made up in solid or liquid formulations. Examples of solid formulations are dust, wetable powders, granules, and pellets. As a dust, dialuric acid compounds may be dispersed in powdered solid carrier such as talc, soaps, soapstone, attapulgus clay, as well as other finely divided solids known to the dusting art. When formulated as wetable powders, the active component may be employed in conjunction with inert fillers which may be of the clay type carrier or non-clay type, in conjunction with various combinations of wetting agents and emulsifiers which permit the adaptation of the concentration as a free flowing powder for dispersion in the field.

Each of these carriers may contain one or more of the dialuric acid compounds of this invention with other carriers or extenders which are ordinarily nonreacting or inert substances such as sand, clays, talc, sawdust, alkaline earth carbonates, oxides, phosphates, and the like, as well as diatomacious earth micas, or other suitable materials. When liquid formulations are desired, liquid extenders, dilutants or carriers of a nonreactive nature may be utilized. Examples of such materials are alcohol, ketones, glycols, aromatic hydrocarbons, petroleum fractions such as octane and various other distillates.

Where it is desired to use the aforementioned wetable powders or liquid formulations, either emulsified, dispersed, or suspended in water or other fluids, one or more of the class of materials herein referred to as adjuvants can also be incorporated into the powder, dust, or liquid formulation. These adjuvants comprise surface active agents, detergents, wetable agents, stabilizers, dispersing agents, suspending agents, emulsifying agents, spreaders, stickers, and conditioning agents generally. To their modifying characteristics these adjuvants may facilitate handling and application and infrequently enhance or potentiate the dialuric acid compositions of this invention in their inhibitory activity by mechanisms which are frequently not well understood. A satisfactory but not exhaustive list of these adjuvants appears in "Soap Chemical Specialties," Volume 31, No. 7, Page 61; No. 8, Pages 38–61; No. 9, Pages 52–67; and No. 10, Pages 38–67 (1955). See also Bulletin No. 607 of the Bureau of Entomology and Plant Quarantine of the United States Department of Agriculture.

An additional advantage of such dialuric acid compositions is their compatibility with a variety of other biocidal and fungicidal materials. For example, it may be convenient to combine one or more dialuric acid compositions with one or more adjuvants and carriers with other pesticides, biocides, and fungicides of various structures. For example, the dialuric acid fungicidal inhibitors may be combined with insecticidal materials such as chlordane, benzene hexachlorides, DDT, DDD, the insecticidal carbamates, polychlorinated terpenes, parathions methoxychlor, insecticidal phosphates, phosphorothioates, phosphorodithioates, and with fungicides such as sulphur, quinones, dodecylgaunidine, and metal dimethyldithiocarbamates.

There are many other considerations such as concentration and method of application which may make some methods of application more favored than others. These considerations may include the type of organisms on which the compound is to be administered, the degree of activity, the degree of inhibition toward the organism, and side effects. Also to be considered is the cost of production and the characteristic solubility of the dialuric acid compounds in the carrier material.

The effectiveness of the dialuric acid compounds as a herbicide was established in the following manner. The appropriate crop plant and herb species were seeded by growth-time requirement schedules in individual disposable containers, watered as required, and maintained in a greenhouse. When the crop plants and herbs reached suitable growth development, generally when the first true leaf stage appeared, the appropriate plants and herbs were selected for the tests on the basis of their uniformity of growth and development. One container of each crop and herb averaging six (corn) to 50 (crabgrass) or more plants or herbs per individual container was then placed on carrying trays for treatment. Generally six crop and six herb containers were used in each evaluation.

The dialuric acid compounds were dissolved in suitable organic solvents and diluted in water containing wetting and emulsifying agents. One carrying tray each of the preemergence (six crops and six weeds) and postemergence (six crops and six weeds) containers was mounted on a conveyor belt having a 1.5 mph linear speed. The trays were designed to trip a microswitch which in turn activated a solenoid valve and released the dialuric acid treatment. Treatments were dispersed as sprays at the indicated concentrations calculated in pounds per acre at 30 p.s.i. pressure. The spray unit was equipped with a Teejet 8003E or similar nozzle tip. Immediately following spray application, preemergence and postemergence treatments are removed to the greenhouse and held for observation. The reference standard was 2-4-D.

Preemergence and postemergence treatments were observed daily for interim response, with final observations being made fourteen days after treatment. Any treatments which induced questionable response were held beyond the 14th-day observation period until such responses could be confirmed. Observations include all abnormal physiological responses of stem bending, petiole curvature, epinasty, hyponasty, retardation, stimulation, root development, necrosis and related growth regulant characteristics. The injury rating are based on a scale of zero (no injury) to 10 (complete kill). The results were as follows:

| Compound | Activity | % Inhibition at 5 pounds/acre | % Inhibition at 10 pounds/acre |
|---|---|---|---|
| Aqueous dialuric acid | Herbicide | | |
| | vs. Buckwheat | 30% | 50% |
| | vs. Mustard | 80% | 80% |
| | vs. Wild Morning Glory | 20% | 40% |

To further illustrate the workings of the antibacterial and antifungal aspects of this invention, the following other examples are submsisted:

EXAMPLE I - Determining Antifungal Activity of

Dialuric Acid Compounds Against Test Organisms

Experimental Technique

The following viable test fungi were treated as described below:

*Fusarium oxysporum*

*Fusarium roseum*

*Rhizopus nigricans*

*Rhizopus stolonifer*

*Aspergillus niger*

*Alternaria solani*

One loopful of each of the above viable fungi cultures, spores and mycelia was transferred from an agar slant to an 80 ml. portion of the nutrient broth composed of oatmeal and deionized water. The 80 ml. portion of the fungi and broth was placed in a sterile shake flask (300 ml.) and the flask was placed on a rotary shaker for 96–120 hours at room temperature. At the end of this incubation time period, 10 ml. of the liquid was homogenized and placed into another sterile shake flask (300 ml.) containing 90 ml. of the above nutrient broth and 60 p.p.m. of dialuric acid or dialuric acid monohydrate. The flasks were placed on a rotary shaker operating at 240 r.p.m. at room temperature from three to nine days. After this second incubation time, the flasks were taken off and examined for visible fungal growth and mycelial weights were then determined. Untreated controls were used as the basis of comparison.

Results

The dialuric acid compounds of this invention imparted to a high degree of inhibition of fungal growth at 60 p.p.m.

EXAMPLE II - Formulation of a Paint having

Anti-Mildew Properties.

The following ingredients were blended and ground together in the indicated proportions in a ball mill.

| Ingredient | Pounds per 1000 Gallons |
|---|---|
| Gum rosin, Grade W.W. | 380 |
| Blown fish oil | 238 |

| Ingredient | Pounds |
|---|---|
| Zinc stearate | 20 |
| Dialuric acid | 20 |
| Zinc oxide | 160 |
| Magnesium silicate | 60 |
| Solvent naphtha | 222* |

* Volume adjusted to 1000 gallons by the addition of naphtha.

EXAMPLE III - Anti-Mildew Paint Formulation.

The following ingredients were blended together in the indicated proportions in a ball mill.

| Ingredient | Pounds per 1000 Gallons |
|---|---|
| Rosin | 300 |
| Coal Tar | 100 |
| Talc | 100 |
| Pine Oil | 50 |
| Dialuric Acid | 50 |
| High Flash Naphtha and Mineral Spirits | 200* |

* Volume adjusted to 1000 gallons by the addition of high flash naphtha and mineral spirits.

EXAMPLE IV - Preparation of a Vinyl Coating Resistant to Mildew Deterioration.

A vinyl coating was prepared using a commericlly available preparation without a fungal growth inhibitor.

An identical vinyl coating was prepared except that 2 percent by weight of dialuric acid or dialuric acid monohydrate was incorporated into the coating formulation.

Two sets of components such as asbestos tubing, silk-wrapped transformers and rayon-wrapped solenoids were obtained. One set was sprayed with the vinyl coating containing inhibitor, the other with the identical coating without inhibitor.

EXAMPLE V - Preparation of Plasticizers Resistant to Mildew.

A commercial thermoplastic monomer was divided into four portions which were treated as follows:

Portion 1: To the first portion was added 2 percent by weight of dialuric acid or dialuric acid monohydrate and 10 percent by weight of diamethylnaphthalate as plasticizer. The monomer was polymerized and molded into 3-inch diameter discs, one fourth inch in thickness prior to testing.

Portion 2: To this portion was added 2 percent by weight of dialuric acid and dialuric acid monohydrate and 10 percent by weight of butyl isodecylphthalate as plasticizer. The monomer was polymerized and molded as above.

Portion 3: This portion was the untreated control of Portion 1 containing no fungal inhibitor but 10 percent by weight of dimethylnaphthalate as plasticizer. Again, the polymerization and molding are identical.

Portion 4: This portion was the untreated control of Portion 2 containing no fungal inhibitor but 10 percent by weight of butyl isodecylphthalate as plasticizer. The polymerization and molding are as described above.

The two plasticizers were chosen on the basis of their known susceptibility to Fusarium attack under high humidity and temperature conditions.

EXAMPLE VI - Evaluation of the Paint Formulations, Vinyl Coatings, and Plasticizers for Mildew and Fungal Resistance.

A. The paint formulations from Examples II and III are painted on steel test panels which are allowed to dry and then placed in an air-tight high temperature and humidity chamber maintained at 80° F. and 95 percent humidity to simulate tropical temperature and humidity conditions. At the same time, steel test panels painted with untreated control formulations were placed in the same chamber.

B. The vinyl coated articles of Example IV were placed in the identical heat and humitidy chamber with the control articles.

C. The discs of Example V made as previously described are placed in a third high temperature and humidity chamber similar to the two described above.

Results

A. After a 1-month test period, the control paint panels were found to be coated with various fungi including *Fusarium*, *Penicillium*, and *Aspergillus* species and were discolored. The treated painted panels were unaffected.

B. After a month's exposure the vinyl coated articles treated with inhibitor were only slightly attacked by rot while the articles coated with vinyl without inhibitor were well rotted.

EXAMPLE VIII - Evaluation of Dialuric Acid Compositions as Mildew Retardant in Cotton.

Tests similar to those described in detail in Method 5762, "Mildew Resistance of Cloth; Soil Burial Method," of Federal Specification CCC-T-191, "Textile Test Methods," were used; that is, standard "blue-line" cotton duck fabrics (3 × 3 inch) were impregnated with two percent solutions of dialuric acid composition calculated on the dry weight of the fabric. The fabric was cut in three 1 × 3 inch strips which were raveled and buried vertically. At the same time, an identical piece of 3 × 3 inch cotton duck fabric untreated for control purposes was buried using the same techniques and location. At the end of 5 days' burial, the two groups of buried cotton were removed and tested for loss of breaking strength as compared to unburied controls. Test results indicate that cloth treated with the dialuric acid compounds require substantially more force to break than the untreated controls.

Thus having disclosed our invention, we claim:

1. A method of killing or inhibiting the growth of microorganisms selected from the group consisting of fungi, Gram positive bacteria, and Gram negative bacteria which comprises applying to said microorganisms an effective bacteriostatic, bactericidal or fungicidal amount of a dialuric acid compound wherein said dialuric acid compound is selected from the group consisting of dialuric acid, dialuric acid monohydrate, and mixtures thereof.

2. The method of claim 1 wherein the bacteriostatic, bactericidal, or fungicidal compound is dialuric acid.

3. The method of claim 1 wherein the bacteriostatic, bactericidal, or fungicidal compound is dialuric acid monohydrate.

4. The method according to claim 1 wherein the Gram positive bacteria are selected from the group consisting of *Staphylococci*, *Corynebacter*, *Listeria*, *Micrococci*, *Mycobacterium*, *Diplococci*, *Xanthomonas*, and *Streptococci*.

5. The method according to claim 4 wherein the *Staphylococci* is *Staphylococcus aureus*.

6. The method according to claim 4 wherein the *Xanthomonas* is *Xanthomonas phaseoli*.

7. The method according to claim 4 wherein the *Corynebacter* are selected from the group consisting of *Corynebacterium diphtheriae* and *Corynebacterium haemolylicum*.

8. The method according to claim 4 wherein the *Streptococci* are selected from the group consisting of hemolytic Group A *Streptococcus*, and hemolytic Group B *Streptococcus*.

9. The method according to claim 4 wherein the *Listeria* is *Listeria monocytogenes*.

10. The method according to claim 4 wherein the *Micrococci* are selected from the group consisting of *Micrococci tetragena*, *Micrococci melitensis*, and *Micrococci lysodeikticus*.

11. The method according to claim 4 wherein the *Mycobacterium* are selected from the group consisting of *Mycobacterium avium*, *Mycobacterium bovis*, *Mycobacterium leprae*, and *Mycobacterium phlei*.

12. The method according to claim 4 wherein the *Diplococci* are selected from the group consisting of *Diplococcus intracellularis* and *Diplococcus pneumoniae*.

13. The method according to claim 1 wherein the Gram negative bacteria are selected from the group consisting of *Escherichia*, *Shigella*, *Salmonella*, *Vibrio*, *Neisseria*, *Hemophilus*, *Bacteroides*, *Brucella*, and *Klebsiella*.

14. The method according to claim 13 wherein the *Escherichia* is *Escherichia coli*.

15. The method according to claim 13 wherein the *Shigella* are selected from the group consisting of *Shigella dysenteriae*, and *Shigella sonnei*.

16. The method according to claim 13 wherein the *Salmonella* are selected from the group consisting of *Salmonella derby*, *Salmonella enteritis*, *Salmonella gallinarium*, *Salmonella panama*, *Salmonella parathyphi*, *Salmonella pullorum*, *Salmonella typhimurium* and *Salmonella typhosa*.

17. The method according to claim 13 wherein the *Vibrio* are selected from the group consisting of *Vibrio cholera* and *Vibrio fetus*.

18. The method according to claim 13 wherein the *Neisseria* are selected from the group consisting of Neisseria *gonorrhoeae*, Neisseria *intracellularis*, and Neisseria *meningitides*.

19. The method according to claim 13 wherein the *Hemophilus* are selected from the group consisting of Hemophilus *hemolyticus*, Hemophilus *influenzae*, Hemophilus *parainfluenzae*, Hemophilus *suis*, and Hemophilus *vaginalis*.

20. The method according to claim 13 wherein the *Bacteroides* are selected from the group consisting of *Bacteroides nigrescens*, *Bacteroides pneumosintes*, and *Bacteroides serpens*.

21. The method according to claim 13 wherein the *Brucella* are selected from the group consisting of *Brucella abortus*, *Brucella melitenis* and *Brucella suis*.

22. The method according to claim 13 wherein the *Klebsiella* is *Klebsiella pneumoniae*.

23. A method of killing or inhibiting the growth of microorganisms selected from the group consisting of fungi, Gram positive bacteria and Gram negative bacteria on plants which comprises applying to said plants an effective bactericidal, bacteriostatic or fungicidal". amount of a compound selected from the group consisting of dialuric acid, dialuric acid monohydrate, and mixtures thereof.

* * * * *